(12) United States Patent
Ham (10) Patent No.: US 8,259,376 B2
(45) Date of Patent: Sep. 4, 2012

(54) DELAYED OPTICAL LOGIC GATES (75) Inventor: Byoung-Seung Ham, Incheon (KR)

(73) Assignee: Inha-Industry Partnership Institute, Incheon (KR)

( * ) Notice: Subject to any disclaimer, the term of this patent is extended or adjusted under 35 U.S.C. 154(b) by 0 days.

(21) Appl. No.: 12/280,923

(22) PCT Filed: Dec. 26, 2007

(86) PCT No.: PCT/KR2007/006846
§ 371 (c)(1),
(2), (4) Date: Aug. 27, 2008

(87) PCT Pub. No.: WO2009/072693
PCT Pub. Date: Jun. 11, 2009

(65) Prior Publication Data
US 2010/0232001 A1    Sep. 16, 2010

(30) Foreign Application Priority Data

Dec. 6, 2007 (KR) .................. 10-2007-0126380
Dec. 6, 2007 (KR) .................. 10-2007-0126381

(51) Int. Cl.
G06E 3/00 (2006.01)
G02F 3/00 (2006.01)
(52) U.S. Cl. ........................ 359/107; 359/108
(58) Field of Classification Search ........... 359/107, 359/108
See application file for complete search history.

(56) References Cited

U.S. PATENT DOCUMENTS 5,757,525 A    5/1998  Rao et al.
6,628,453 B2   9/2003  Ham
2008/0258049 A1* 10/2008 Kuzmich et al. ........... 250/214.1
2011/0116144 A1   5/2011  Ham

FOREIGN PATENT DOCUMENTS

WO    2008050938 A1   5/2008
WO    2009072693 A1   6/2009
WO    2009072694 A1   6/2009

OTHER PUBLICATIONS

Response to Office Action Restriction dated Jun. 22, 2011, U.S. Appl. No. 13/014,344, filed Jan. 26, 2011.

(Continued)

Primary Examiner — Jade R Chwasz
(74) Attorney, Agent, or Firm — Vierra Magen Marcus & DeNiro LLP (57) ABSTRACT A system, method, and apparatus for delayed optical logic gates based on slow light and enhanced nondegenerate four-wave mixing processes, where a single or multiple delayed optical routers are utilized for dark resonance interactions in which two-color lasers interact with a three-level nonlinear optical medium comprised of two ground states and one excited state through the nondegenerate four-wave mixing processes. The delayed optical logic mechanism is based on combination of single or multiple dark resonance-induced two-photon coherence conversion via slow light phenomenon. The two-photon coherence induced on the ground states is optically detected via nondegenerate four-wave mixing processes. The nondegenerate four-wave mixing generation is enhanced owing to dark resonance or electromagnetically induced transparency. The gating time and bandwidth of the present delayed optical logic gates is invariant to the delayed time of the delayed optical router because IN and OUT bandwidth across the nonlinear medium must be same.

11 Claims, 6 Drawing Sheets

OTHER PUBLICATIONS

Office Action Restriction dated Dec. 5, 2011, U.S. Appl. No. 13/014,344, filed Jan. 26, 2011, 11 pages.

Response to Office Action Restriction dated Jan. 4, 2012, U.S. Appl. No. 13/014,344, filed Jan. 26, 2011, 12 pages.

Bigelow et al, "Superluminal and Slow Light Propagation in a Room-Temperature Solid", Science, vol. 301, No. 5630, Jul. 11, 2003, pp. 200-202, 3 pages.

Gauthier, et al., "Slow Light: From Basics to Future Prospects", Photonics Spectra, Mar. 2006, pp. 44-50, 6 pages.

Ham et al., "Efficient phase conjugation via two-photon coherence in an optically dense crystal", The American Physical Society, Physical Review A, vol. 59, No. 4, Apr. 1999, pp. R2583-R2586, 4 pages.

Ham, et al., "Enhanced Nondegenerate Four-wave Mixing Owing to Electromagnetically Induced Transparency in a Spectral Hole-burning Crystal", Optical Society of America, Optics Letters, vol. 22, No. 15, Aug. 1, 1997, pp. 1138-1140, 3 pages.

Ham, B.S., "Experimental demonstration of all-optical 1x2 quantum routing", Applied Physics Letters, vol. 85, Issue 6, Aug. 9, 2004, pp. 893-895, 3 pages.

Ham, B.S., "Population shelved all-optical modulation", Physical Review B, vol. 68, No. 7, Aug. 29, 2003, pp. 073102-1-4, 4 pages.

Harris, Stephen E., "Electromagnetically Induced Transparency," Physics Today 50(7), Jul. 1997, pp. 36-42, 7 pages.

Harris, Stephen E., "Lasers without Inversion: Interference of Lifetime-Broadened Resonances", The American Physical Society, Physical Review Letters, vol. 62, No. 9, Feb. 27, 1989, pp. 1033-1036, 4 pages.

Harris et al., "Nonlinear Optical Processes Using Electromagnetically Induced Transparency", The American Physical Society, Physical Review Letters, vol. 64, No. 10, Mar. 5, 1990, pp. 1107-1110, 4 pages.

Hau et al., "Light speed reduction to 17 metres per second in an ultracold atomic gas", Macmillan Magazines Ltd., Nature, vol. 397, Feb. 18, 1999, pp. 594-598, 5 pages.

Hemmer et al., "Efficient low-intensity optical phase conjugation based on coherent population trapping in sodium", The Optical Society of America, Optics Letters, vol. 20, No. 9, May 1, 1995, pp. 982-984, 3 pages.

Jain et al., "Efficient Nonlinear Frequency Conversion with Maximal Atomic Coherence", The American Physical Society, Physical Review Letters, vol. 77, No. 21, Nov. 18, 1996, pp. 4326-4329, 4 pages.

Ku et al., "Slow light in semiconductor quantum wells", Optical Society of America, Optics Letters, vol. 29, No. 19, Oct. 1, 2004, pp. 2291-2293, 3 pages.

Totsuka et al., "Slow Light in Coupled-Resonator-Induced Transparency", The American Physical Society, Physical Review Letters, vol. 98, No. 21, May 25, 2007, p. 213904 1-4, 5 pages.

Turukhin et al., "Observation of Ultraslow and Stored Light Pulses in a Solid", The American Physical Society, Physical Review Letters, vol. 88, No. 2, Jan. 14, 2002, pp. 023602-01-023602-4, 4 pages.

Wu et al., "High-efficiency double phase conjugation in a Ce-doped strontium barium niobate crystal", Optical Society of America, Optics Letters, vol. 18, No. 2, Jan. 15, 1993, pp. 98-100, 3 pages.

Office Action dated Feb. 3, 2012, U.S. Appl. No. 13/014,344, filed Jan. 26, 2011, 23 pages.

* cited by examiner

DELAYED OPTICAL LOGIC GATES

CLAIM OF PRIORITY

This application claims priority to Korean Patent Application No. 10-2007-0126380 filed on Dec. 6, 2007, Korean Patent Application No. 10-2007-0126381, filed on Dec. 6, 2007, and PCT Patent Application No. PCT/KR2007/006846 filed on Dec. 26, 2007, all of which are incorporated herein by reference.

BACKGROUND OF THE INVENTION

1. Field of the Invention

The present invention relates to a method and apparatus for delayed optical logic gates, where the physics lies in quantum-coherence-based slow light and enhanced nondegenerate four-wave mixing processes.

2. Description of the Related Art

In an electronic transistor, the switching time is determined by the carriers' transfer time across a gate, where the size of the transistor gate has been decreased for last three decades. This is called Moore's law and has been succeeded. Nowadays silicon semiconductor technologies are migrating into photonics, and this trend is called silicon photonics. In the fiber-optic communications, most optical devices are controlled by electric current or electric voltage, where the control circuit is Si-based electronics. However the electronics is much slower than optics. Thus speed constraint of an electrooptic device lies in the electronics. Recently, quantum switch and photon logic gates are introduced to overcome such limitations in the switching technologies: B. S. Ham, U.S. Pat. No. 6,628,453 (2003); B. S. Ham, PCT patent filing number PCT/KR2007/001130 (2007).

On the other hand, in fiber-optic communications, optical switching technologies have been rapidly evolved for faster switching components. In this optoelectronics area electronic counterpart is lagged behind in speed itself. Thus overall performance of all-optical switching devices is should be slowed down. Obviously computer-based electro-optic device has the speed constraint on the electronics.

To overcome such unbalance between optics and electronics, buffering techniques have been introduced. This buffering method is to delay the fast optical data traffic on demand for the relatively slow electronic components. Thus, adjustable buffering memory techniques are expected. Unfortunately all-optical active buffer memory has not been implemented, yet. Most of the suggested ideas, inventions or devices, however, are passive like such as using a bundle of fiber-optic cables and a ring resonator on a silicon waveguide.

It is well known that resonant two-color electromagnetic fields can induce a refractive index change in a nonlinear optical medium composed of three energy levels or more. In a three-level optical system composed of two-closely spaced ground states, the refractive index change can result in not only absorption cancellation at line center but also two-photon coherence excitation on the ground levels. This phenomenon is called dark resonance or electromagnetically induced transparency (EIT) in the context of optically dense medium: S. E. Harris, Phys. Today. Vol. 50 (No. 7), p. 36 (1997); Phys. Rev. Lett. Vol. 62, pp. 1033-1036 (1989)). Because EIT modifies the absorption spectrum of an optical medium, the medium's dispersion must be also modified via Kramers Kronig relations. The modified dispersion profile directly affects on a group velocity of a traveling light pulse through the optical medium. This is so called a slow light phenomenon. Recently the slow light phenomenon has been observed in cold atoms (Hau et al., Nature Vol. 397, pp. 594-598 (1999)), defected solids (B. S. Ham et al., Phys. Rev. Lett. Vol. 88, p. 236024 (2002)), s fiber-coupled resonator (Totsuka et al., Phys. Rev. Lett. Vol. 98, p. 213904 (2007), and semiconductors (Wang et al., Opt. Lett. Vol. 29, pp. 2291-2293 (2004).

An optical router is a switching device converting an optical signal into another one at different propagation directions with either the same frequency basis or not. The optical router is a subcategory of an optical switch that is in general used to drop, add, multiplex, or convert an optical signal into another one. In fiber-optic communications, as more data traffic is demanded, more information bandwidth is needed. In this case a wider bandwidth optical switch is obviously expected. So far optical switching speed is already passed over 60 GHz, which is much faster than a Pentium CPU. Thus, more often it is required that the data traffic in fiber-optic communication lines need to be temporally delayed for some data processing purposes. Obviously, an optical buffer memory becomes an essential component to an optical data processing unit.

A delayed optical router has been suggested. According to the delayed optical router, a slow light is used for routing via nondegenerate four-wave mixing processes. Thus the delayed optical router can delay the input data up to the group delay time, which is the delay time can be controllable by adjusting coupling light intensity C in FIG. 1: Ham et al., Physical Review Letters, Vol. 88, p. 236024 (2002).

SUMMARY OF THE INVENTION

The primary object of the present invention is to provide a method and apparatus of a delayed optical logic gates. The main characteristic of the delayed optical logic gates is that the logic operation is based on the slow light and nondegenerate four-wave mixing processes, where the slow light excites quantum coherence on the ground states and this quantum coherence is retrieved into photon component via the wave-mixing processes. Here, it should be noted that the slowdown factor does not degrade the overall data traffic rate at all, because the data traffic rate across the delayed optical switch/router should be same. It means that the switching/routing bandwidth is invariant to the slowdown factor in the present invention. Moreover, the slow group velocity is a direct result of medium's dispersion modification due to EIT or coherent population oscillations (Boyd et al., Science Vol. 301, pp. 200-202 (2003)). Therefore, the optical delay time in the present invention of the delayed optical logic gates is actively controllable. Actually this function of the slowdown is the main function of an optical buffer memory. Hence, the present invention of the delayed optical logic gates includes the function of the optical buffer memory, too.

For better understanding of delay optical logic operation, let's carefully study how incoming optical data traffic behaves at the interfaces of a nonlinear optical medium used for the present delayed optical logic gates. At the front interface of it, the data traffic incident becomes slow down depending on the group velocity. In more detail, the front part of an optical pulse envelope incident to an optical medium of the delayed optical router starts to be compressed in both space and time until the back end of the pulse envelope enters the medium. The compressed optical pulse now propagates through the medium in a slow speed until it reaches at the back end of the medium. Here it should be noted that consecutive optical pulse entering the nonlinear medium does not collide with each other at the interface even though the propagation velocity is very different. When the optical pulse leaves the medium at the back end, the front part of the optical pulse envelope now begins to fly forward in a very high speed until the back end of the pulse envelope leaves the medium. Therefore the data traffic rate across the delayed optical logic gates is invariant.

In the present invention of the delayed optical logic gates, several Boolean logic gates are claimed for NOT, OR, NOR, XOR, AND, and NAND in all-optically delayed regime. The primary object of the present invention is to provide a method and an apparatus of a delayed optical logic gates based on slow light and nondegenerate four-wave mixing processes.

The delayed optical logic gates have functions of dynamically controllable delay-time of the incoming signal light using slow light phenomenon, where the delay-time of the logic gates is controllable by adjusting another coupling light intensity to affect on the group delay of the slow light. The switching time for each signal light pulse limits in phase decay time of the optical nonlinear medium (B. S. Ham, Applied Physics Letters, Vol. 85 (No. 6), pp. 893-895 (2004); Physical Review B, Vol. 68 (No. 7), pp. 023811 (2003); U.S. Pat. No. 6,628,453). However, the bandwidth of the delayed optical logic gates or overall gating speed is invariant of the group delay of the slow light because the bandwidth of 'IN' and 'OUT' across the nonlinear medium used for the delayed optical logic gates is same. Main advantage of the present invention of the delayed optical logic gates is the data delay-time controllability useful for a slow electronic device to alleviate processing power toward high-speed optical data rates.

Figure 1:
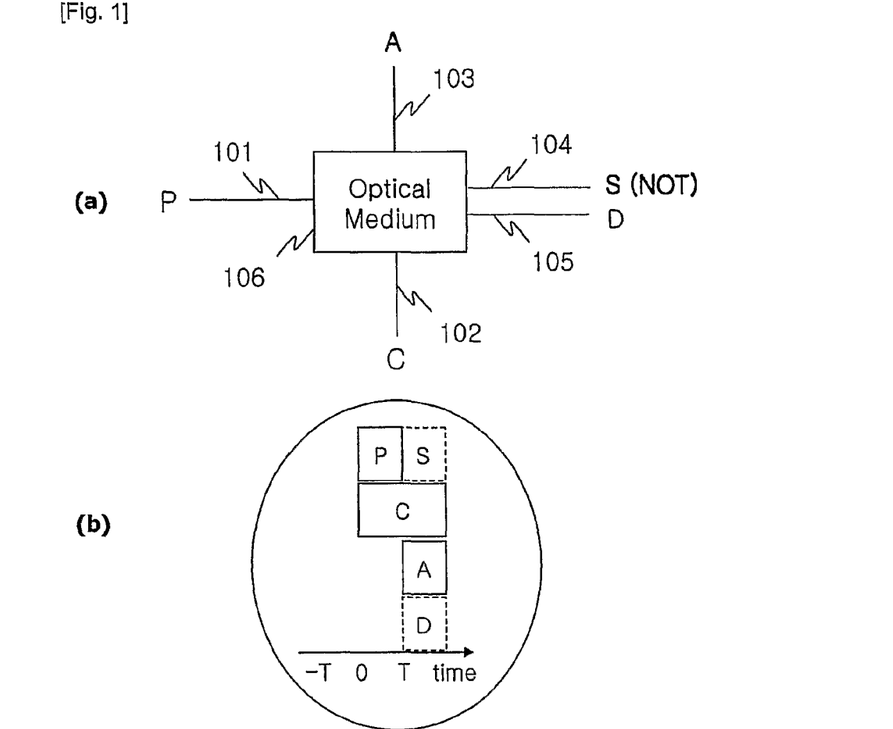

Briefly described, a system of the delayed optical logic gates of the present invention is provided by multiply connected delayed optical routers composed of a nonlinear optical medium and coherent light pulses. The nonlinear optical medium of the delayed optical logic gates is composed of at least three-energy levels. Two of them should be closely spaced on the ground states, and the third one should be an excited state. The frequencies of the laser light of C and A are either same or different depending on purposes: See FIG. 1. The light pulse A is used as a control for nondegenerate four-wave mixing processes to generate the output pulse D. The nondegenerate four-wave mixing output D can be used as an input(s) to the second nonlinear medium to configure the present invention of the delayed optical logic gates. In FIG. 1 the output S is the slow light of the input light P. According to nondegenerate four-wave mixing process, S and D are alternative. Each light pulse can be guided by an optical waveguide, free space, or surface plasmon optical waveguide. The optical waveguide is not part of the current invention. By connecting two or more delayed optical routers, the present invention of the delayed optical logic gates performs the Boolean logic: NOT, NAND, AND, OR, XOR, and NOR. The delayed optical logic gates can be applied for scalability purposes. The transmission time between two delayed optical logic gates is negligible because the light pulse moves almost speed of light.

To achieve these and other advantages as described above and in accordance with the purpose of the present invention, this specification provides a method for operating a logical gate using at least one delayed optical router comprising a nonlinear optical medium, wherein the nonlinear optical medium comprises two closely spaced ground states such that a transition between said two ground states is dipole forbidden, and an excited state such that two-photon transitions between said two ground states via said excited state are allowed, the method comprising:

using at least one of a slow light (S) and a nondegenerate four-wave mixing signal (D) as a result of Boolean algebra, wherein the slow light (S) is appeared by applying, to the nonlinear optical medium, a first laser beam (P) with a first frequency corresponding to a first transition between a first ground state of the two ground states and the excited state and a second laser beam (C) with a second frequency corresponding to a second transition between a second ground state of the two ground states and the excited state; and the nondegenerate four-wave mixing signal (D) is appeared by applying, to the nonlinear optical medium, the first laser beam (P) with the first frequency, the second laser beam (C) with the second frequency and a third laser beam (A) with a third frequency corresponding to the second transition.

This specification also provides a method of operating a logical gate using at least one delayed optical router comprising a nonlinear optical medium, wherein the nonlinear optical medium comprises two closely spaced ground states such that a transition between said two ground states is dipole forbidden, and an excited state such that two-photon transitions between said two ground states via said excited state are allowed, the method comprising: a) applying, to said nonlinear optical medium, a first laser beam (P) at a first frequency corresponding to a first transition between a first ground state of said two ground states and said excited state; b) applying, to said nonlinear optical medium, a second laser beam (C) at a second frequency corresponding to a second transition between a second ground state of said ground states and said excited state; c) applying, to said nonlinear optical medium, a third laser beam (A) at a third frequency corresponding to the second transition between the second ground state of said ground states and said excited state; d) adjusting an intensity of said second laser beam (C) to produce a slow light (S), wherein said slow light (S) corresponds to a group velocity slow down of said first laser beam (P); e) adjusting at least one of intensities of said first laser beam (P), said second laser beam (C), said third laser beam (A), to produce a nondegenerate four-wave mixing signal (D) at a frequency corresponding to a two-photon coherence excitation $[Re\rho_{12}]^2$, wherein said slow light (S) is disappeared in response to the producing of said nondegenerate four-wave mixing signal (D); and f) using at least one of said produced slow light (S) and said nondegenerate four-wave mixing signal (D) as a result of a logical gate.

This specification also provides an apparatus for an optical logic gate, comprising;

at least one delayed optical router including at least one nonlinear optical media, wherein the nonlinear optical medium comprises two closely spaced ground states such that a transition between said two ground states is dipole forbidden, and an excited state such that two-photon transitions between said two ground states via said excited state are allowed;

at least one port for outputting a result of the optical logic gate, wherein the result is represented as at least one or more of a slow light and a nondegenerate four-wave mixing signal (D), the slow light (S) is appeared by applying, to the nonlinear optical medium, a first laser beam (P) with a first frequency corresponding to a first transition between a first ground state of the two ground states and the excited state and a second laser beam (C) with a second frequency corresponding to a second transition between a second ground state of the two ground states and the excited state; and the nondegenerate four-wave mixing signal (D) is appeared by applying, to the nonlinear optical medium, the first laser beam (P) with the first frequency, the second laser beam (C) with the second frequency and a third laser beam (A) with a third frequency corresponding to the second transition.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying figures illustrate several embodiments of the present invention, and together with the descriptions, serve to explain the principles of the invention. The drawings are for only for the purpose of illustrating a preferred embodiment of the invention and are not to be construed as limiting the invention.

FIG. 1 (a) illustrates a block diagram of a delayed optical logic gate, NOT, of the present invention. FIG. 1 (b) illustrates the light pulse sequence. The relationship between 104 (S) and 105 (D) is a toggle switch.

FIG. 2 (a) shows an energy level diagram of the present invention of the delayed optical logic gates: FIG. 2 (b) shows a propagation scheme of the light for time-delayed scheme between 102 (C) and 103 (A).

FIG. 3 (a) shows a slow light S and FIG. 3 (b) shows a routed light D based on nondegenerate four-wave mixing processes: Delayed optical switching/routing. The spatial direction of the output light S and D is determined by the phase matching conditions of the input light P, C, and A in FIG. 1.

DESCRIPTION OF THE PREFERRED EMBODIMENTS

To get a better understanding, reference is now made to the drawings which illustrate the preferred embodiments of the present invention.

FIG. 1 (a) shows a delayed optical router as a basic building block for the present invention of the delayed optical logic gates.

FIG. 1(a) describes a delayed optical logic gate, NOT, where a single delayed optical router is used. Letters P, C, A, S, and D stand for light pulse at different propagation directions $k_P$, $k_C$, $k_A$, $k_S$, and $k_D$, respectively. The numbers from 101 to 105 stand for lights as well as physical channels such as optical waveguide or free space used for the laser beams. The number 106 stands for a nonlinear optical medium. According to the delayed optical router, which will be explained below, the output S (104) is always OFF whenever the logical input light A (103) is switched ON, and vice versa. Here it should be noted that the light C may be continuous if the frequency of the light C is different from the light A. TABLE 1 shows the resulting Boolean algebra NOT of FIG. 1: The light C is always ON. Meanwhile, FIG. 1 (b) shows a pulse sequence.

TABLE 1

| P | A | S (NOT) | D |
|---|---|---------|---|
| 1 | 0 | 1       | 0 |
| 1 | 1 | 0       | 1 |

Figure 2:
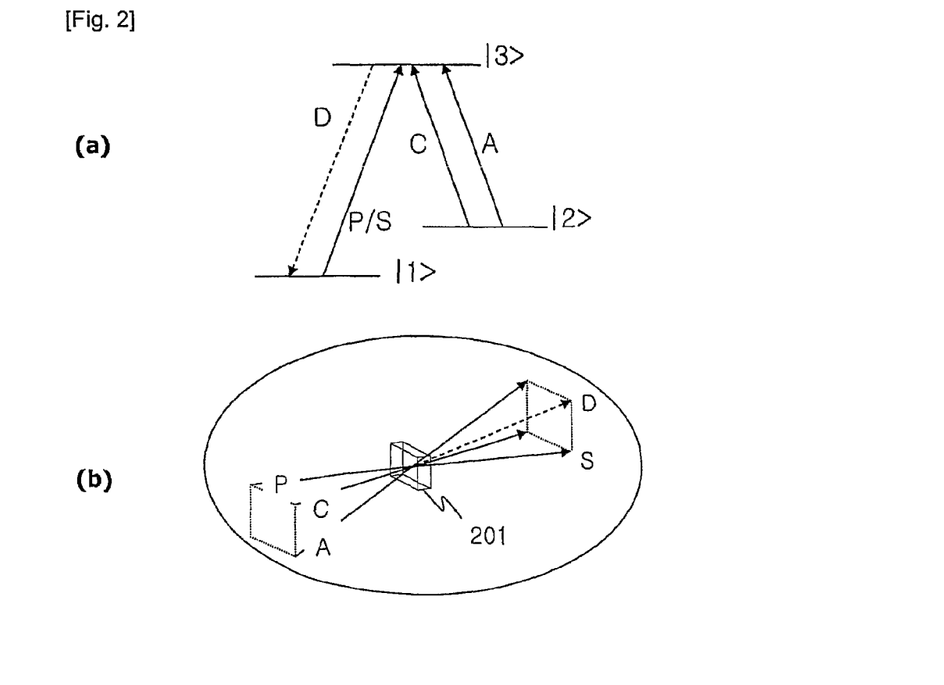

FIG. 2 shows an energy level diagram of the nonlinear optical medium 106 of FIG. 1. The lower two closely spaced energy levels are resulted from the hyperfine splitting of most atoms or rare-earth doped crystals. The energy level structure of FIG. 2 can also be obtained easily in semiconductor quantum wells or quantum dots utilizing heavy hole and light hole for exciton transitions or trion transitions. The nonlinear optical medium 106 of FIG. 1 has either three energy states; |1>, |2>, and |3> or four energy states; |1>, |2>, |3>, and |4>, where the level |4> is either virtual or real. The state |3> of FIG. 2 is higher than |1> and |2> in energy. In fact the nonlinear optical medium 106 of FIG. 1 may have more than three energy levels, but only the mentioned energy levels shown in FIG. 2 contribute to the photon logic mechanism of the present invention.

The output light D at frequency $\omega_D$ is generated by nondegenerate four-wave mixing processes, where three laser interactions of P, C, and A are involved at frequencies $\omega_P$, $\omega_C$, and $\omega_A$, respectively, with the nonlinear optical medium.

Similarly, the output light S at frequency $\omega_S$ is generated by electromagnetically induced transparency (BIT) or coherent population oscillations (CPO) due to modified absorption and dispersion spectra: Refer S. E. Harris, Physical Review Letters, Vol. 64, pp. 1107-1110 (1991) for EIT, and R. Boyd et al., Science Vol. 301, pp. 200-202 (2003) for CPO.

The propagation directions of the light are shown in FIG. 2 (b), and are determined by the phase matching conditions, respectively: $k_D = k_C - k_P + k_A$. Here, the nondegenerate four-wave mixing generation is strongly enhanced owing to dark resonance or EIT: Harris in Physical Review Letters, Vol. 64, pp. 1107-1110 (1991); Jain et al. in Optics Letters Vol. 18, pp. 98-101 (1993); Ham et al. in Optics Letters, Vol. 22, pp. 1138-1140 (1997). Signal amplifications and high-conversion efficiency using atomic gases for nondegenerate four-wave mixing processes were also experimentally demonstrated by Hemmer at al. in Optics Letters, Vol. 20, pp. 982-984 (1995) and Jain et al. in Physical Review Letters, Vol. 77, pp. 4326-4329 (1996), respectively. The high-conversion efficiency of nondegenerate four-wave mixing processes was also experimentally demonstrated in ion-doped solids by Ham et al. in Physical Review A, Vol. 59, pp. R2583-2586 (1999). The enhancement of nondegenerate four-wave mixing processes is based on reduced first-order linear susceptibility and enhanced third-order nonlinear susceptibility owing to destructive and constructive quantum interference, respectively.

To show more detail relations between the input signal light P and the nondegenerate four-wave mixing output light D, coherence mapping should be understood. To see the coherence excitation in FIG. 2, density matrix p must be discussed. The density matrix has been a useful tool to show a system's macroscopic ensemble; *Quantum optics*, Cambridge University Press, New York, N.Y. (1997), Edited by Scully and Zubairy.

In FIG. 2 (a), two laser beams C and P can induce two-photon coherence $\rho_{12}$ on the transition |1>-|2> via the excited state |3>. The two-photon coherence is strongly enhanced if dark resonance or EIT involves. Here, dark resonance or EIT is the same physical phenomenon, but the term EIT roots in the absorption cancellation so that a resonant electromagnetic field can pass through an optically thick medium without experiencing any absorption. When coherent light A interacts with the nonlinear optical medium after the interaction for EIT, the two-photon coherence or dark resonance can be retrieved toward light P if the frequency of D is same as that of C: Ham et al, Opt. Lett. Vol. 22, pp. 1138-1140 (1997). Because coupling light C modifies the refractive index of the nonlinear optical medium 106 of FIG. 1, the dispersion profile is also modified, so that the group velocity of the signal light P can be slowed down: Hau et al., Nature Vol. 397, pp. 594-598 (1999) and B. S. Ham et al., Phys. Rev. Lett. Vol. 88, p. 236024 (2002). The slow light is denoted by S. The light propagation vectors of the light P and S is same each other.

Figure 3:
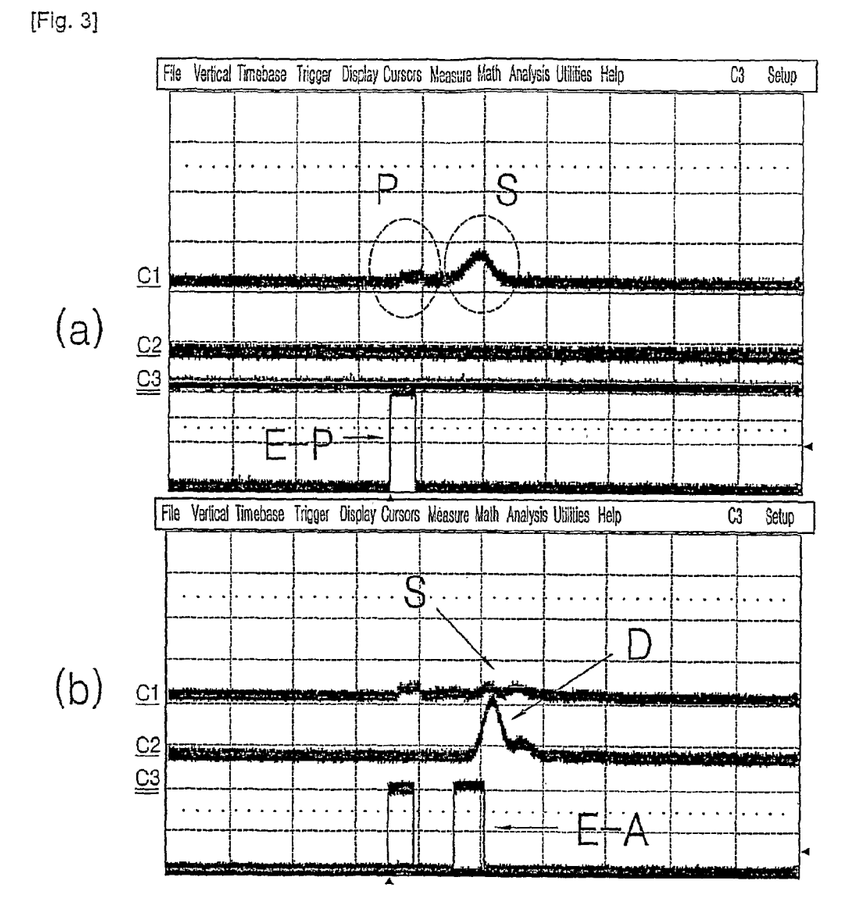

FIG. 3 (a) shows a slow light S and FIG. 3 (b) shows a routed light D observed in $Pr^{3+}$:YSO based on FIG. 2. This proves delayed nondegenerate four-wave mixing signal D, and the delayed light S can be used for delayed optical routing. E-P (E-A) stand for electric reference for P (A).

Figure 4:
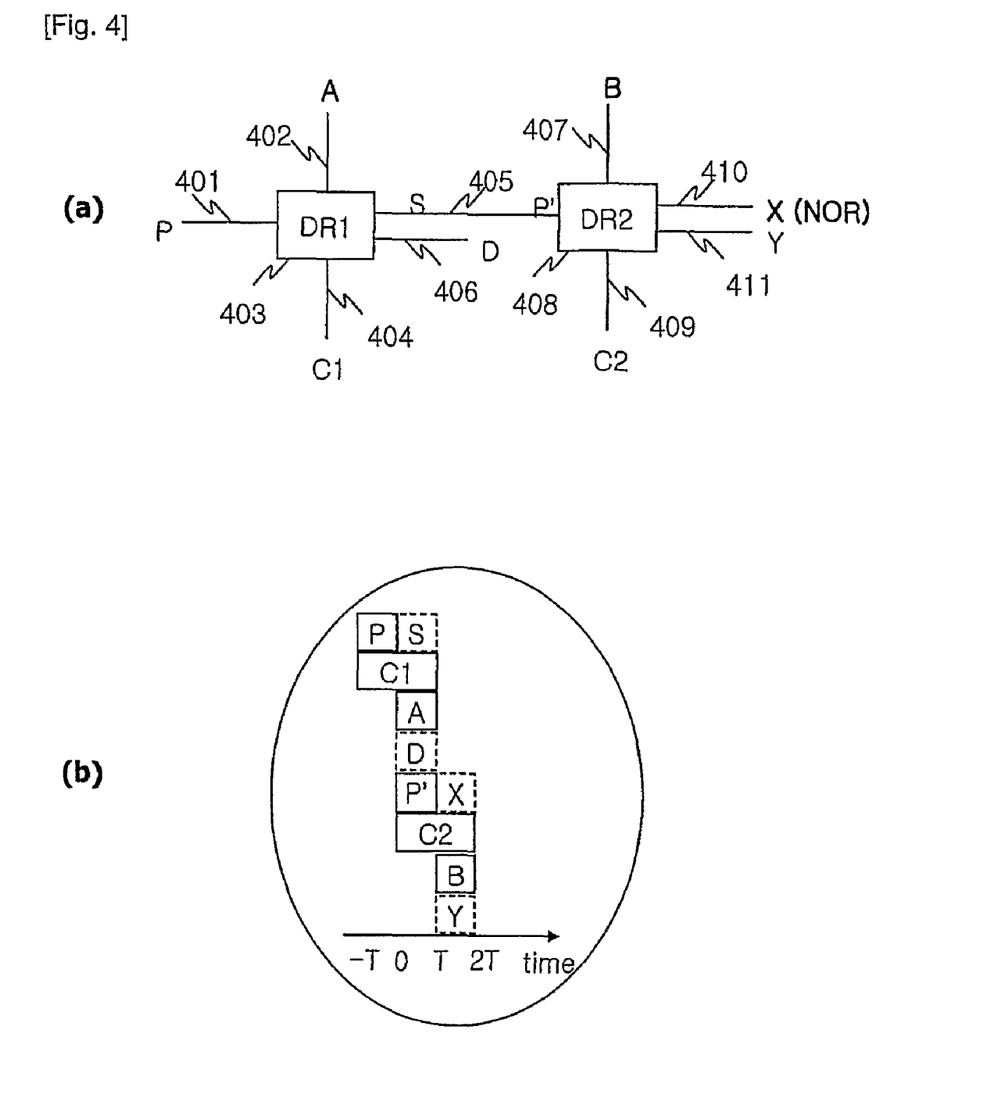
FIG. 4 illustrates a schematic diagram of a delayed optical logic gate, NOR, of the present invention. Letter DR stands for the delayed optical router comprised of a nonlinear optical medium 106 in FIG. 1, which is connected by optical waveguides, free space, or plasmon optical waveguide used for the laser beams P, C1, A, C2, B, S, D, X, and Y.

FIG. 4 (a) describes a delayed optical logic gate, i.e., NOR gate, where two-delayed optical routers are connected in series. Here, the output S (405) of the left (first) delayed optical router (DR1) is fed into the right (second) delayed optical router (DR2) as an input light (see P in FIG. 1). Two logical input light A (402) from DR1 and B (407) from DR2 perform optical logic inputs and result in Boolean algebra NOR at the output X (410). TABLE 2 shows the Boolean algebra of NOR resulted in the outputs X (406) by the combinations of two logic inputs A (402) and B (407). FIG. 4 (b) shows a pulse sequence.

TABLE 2

| P | A | B | S | D | X(NOR) | Y |
|---|---|---|---|---|--------|---|
| 1 | 0 | 0 | 1 | 0 | 1      | 0 |
| 1 | 0 | 1 | 1 | 0 | 0      | 1 |
| 1 | 1 | 0 | 0 | 1 | 0      | 0 |
| 1 | 1 | 1 | 0 | 1 | 0      | 0 |

Figure 5:
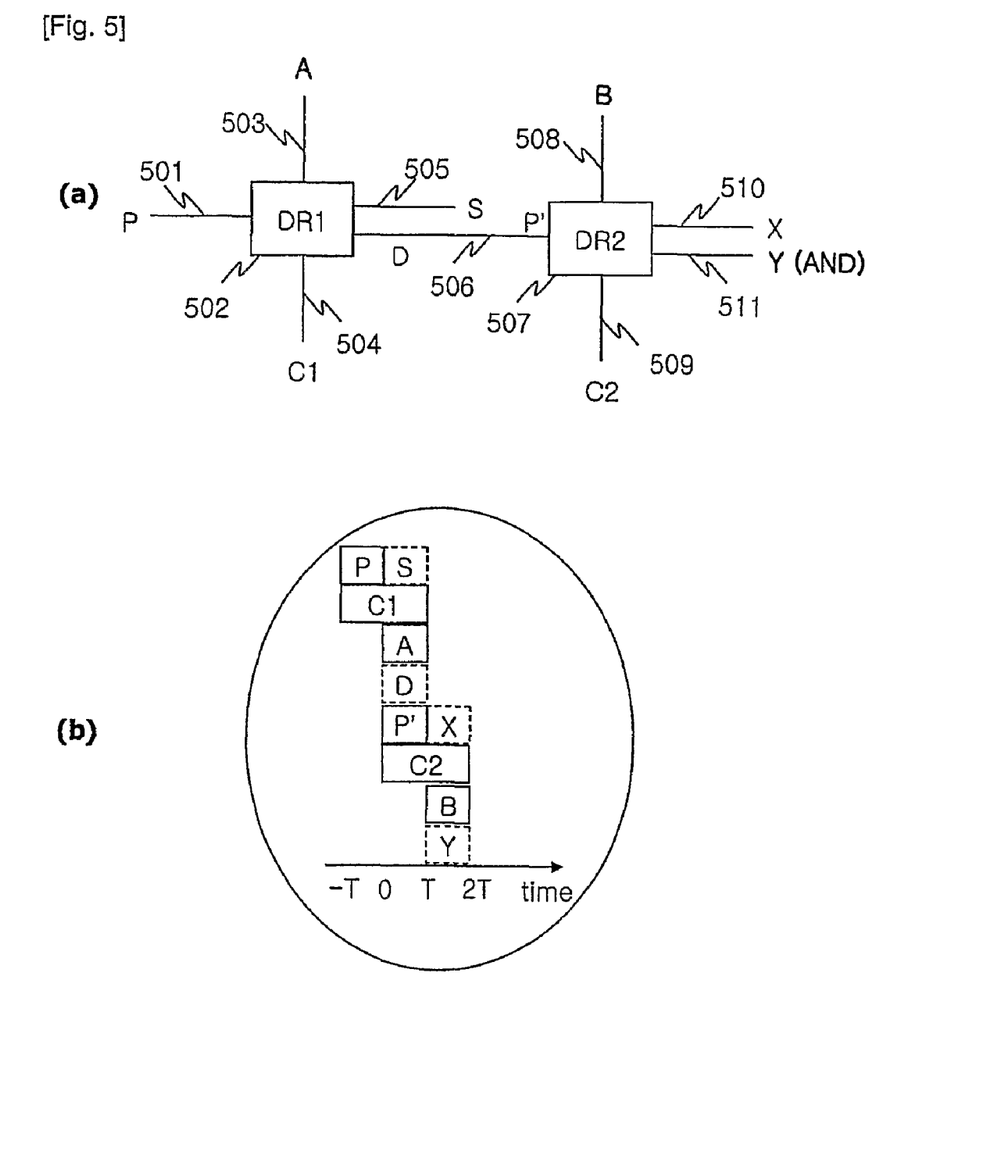
FIG. 5 illustrates a schematic diagram of a photon logic gate, AND, of the present invention. Letter DR stands for the delayed optical router comprised of a nonlinear optical medium 106 in FIG. 1, which is connected by optical waveguides, free space, or plasmon optical waveguide used for the laser beams P, C1, C2, A, B, S, D, X, and Y.

FIG. 5 (a) shows a delayed optical logic gate, i.e., AND gate, where the logic gate is composed of two delayed optical routers connected in series. Here, the output D (506) of the left delayed optical router DR1 (502) is fed into the right delayed optical router DR2 (507) as an input P (see P in FIG. 1). The combination of two logic input light A (503) from DR1 and B (508) from DR2 result in Boolean algebra AND to the output Y (511). TABLE 3 shows a resulting Boolean algebra AND appeared in the output Y (511) according to two logic inputs A (503) and B (508). FIG. 5 (b) shows a pulse sequence.

TABLE 3

| P | A | B | S | D | X | Y (AND) |
|---|---|---|---|---|---|---------|
| 1 | 0 | 0 | 1 | 0 | 0 | 0       |
| 1 | 0 | 1 | 1 | 0 | 0 | 0       |
| 1 | 1 | 0 | 0 | 1 | 1 | 0       |
| 1 | 1 | 1 | 0 | 1 | 0 | 1       |

Figure 6:
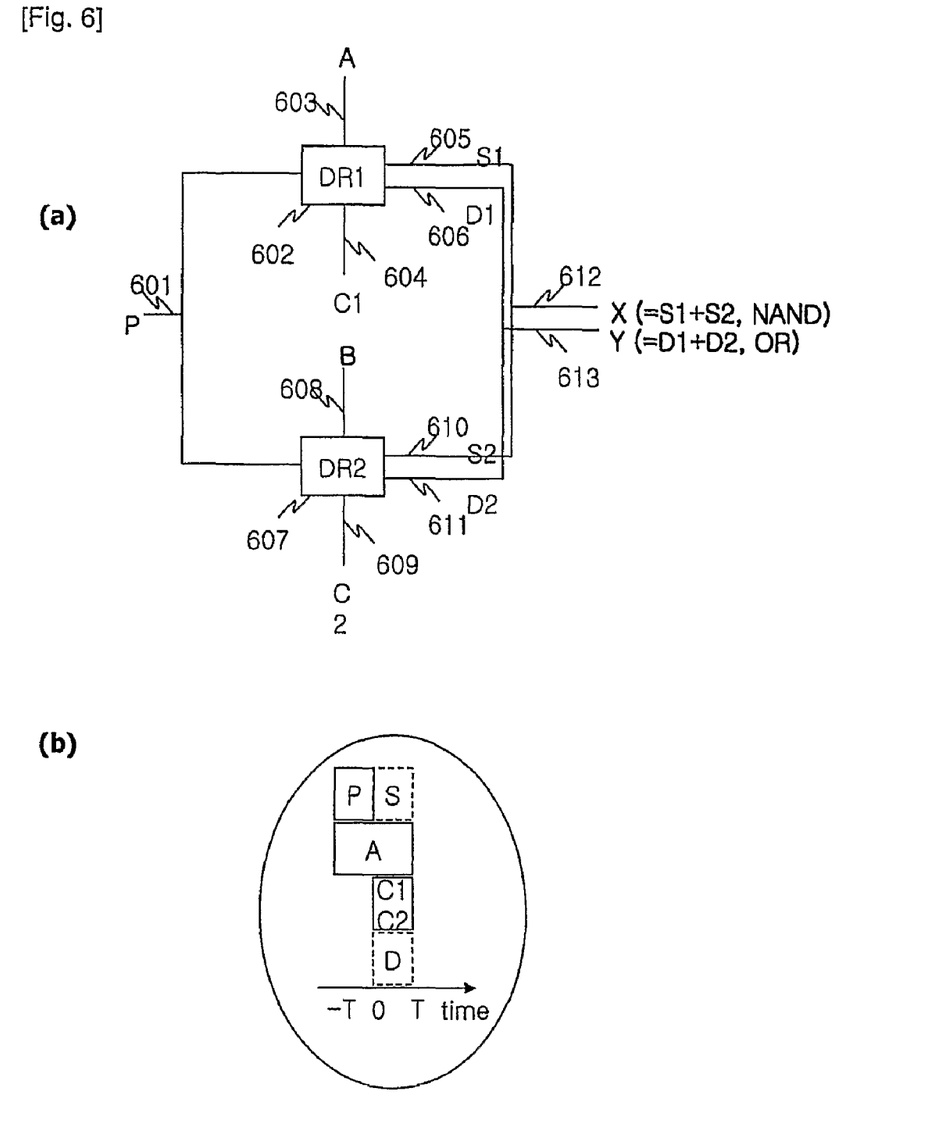
FIG. 6 illustrates a schematic diagram of a delayed optical logic gate, NAND/OR, of the present invention. Letter DR stands for the delayed optical router comprised of a nonlinear optical medium 106 in FIG. 1, which is connected by optical waveguides, free space, or plasmon optical waveguide used for the laser beams P, C1, C2, S, D, S1, D1, S2, D2, X, and Y.

FIG. 6 (a) shows a delayed optical logic gate, i.e., NAND/OR gate. The system is composed of two-delayed optical routers connected in parallel, where the input light P (601) is shared. The output S1 (605) from the top delayed optical router DR1 and S2 (610) from the bottom delayed optical router DR2 is combined together to lead the logic output X (612). The outputs D1 (606) and D2 (611) are combined to lead the logic output Y (613). The signal light P (601) is split into two components through an optical splitter/combiner such as a Y branch or a beam splitter. Under the action of two inputs A (603) and B (608), the output logic X (612) and Y (613) perform Boolean logic operations NAND and OR, respectively: see TABLE 4. FIG. 6 (b) shows a pulse sequence.

TABLE 4

| P | A | B | S1 | D1 | S2 | D2 | X (NAND) | Y (OR) |
|---|---|---|----|----|----|----|----------|--------|
| 1 | 0 | 0 | 1  | 0  | 1  | 0  | 1        | 0      |
| 1 | 0 | 1 | 1  | 0  | 0  | 1  | 1        | 1      |
| 1 | 1 | 0 | 0  | 1  | 1  | 0  | 1        | 1      |
| 1 | 1 | 1 | 0  | 1  | 0  | 1  | 0        | 1      |

Figure 7:
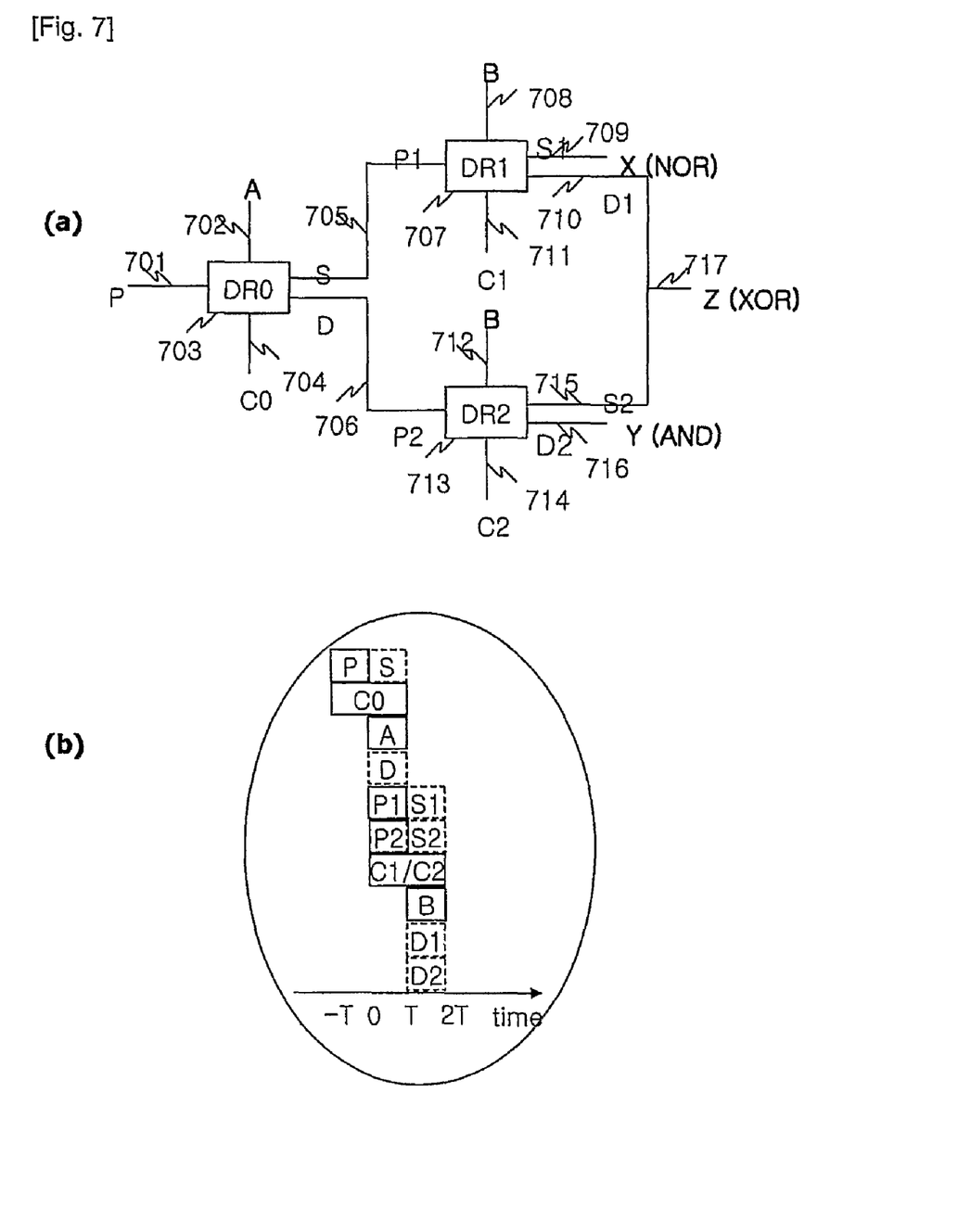
FIG. 7 illustrates a schematic diagram of a delayed optical logic gate, NOR/XOR/AND, of the present invention. Letter DR stands for the delayed optical router comprised of a nonlinear optical medium 106 in FIG. 1, which is connected by optical waveguides, free space, or plasmon optical waveguide used for the laser beams P, C0, C1, C2, A, B, S, D, S1, D1, S2, D2, X, Y, and Z.

FIG. 7 (a) shows a delayed optical logic gate, i.e., NOR/XOR/AND gate. The system is composed of three delayed optical routers, where two of them are connected to the third one. Each output S (705) and D (706) of the delayed optical router DR0 is used as an input to the delayed optical routers DR1 and DR2, respectively. The output S1 (709) of the DR1 is used as a logic output X. The outputs D1 (710) and S2 (715) are combined together to lead the logic output Z (717). The output D2 (716) from the DR2 is used as a logic output Y. There are two logic inputs A (702) and B (708, 712), where A is for the DR0 and B is for both DR1 and DR2. As seen in TABLE 5, the two logic inputs A and B performs Boolean algebra NOR at the output X, XOR at Z, and AND at Y, simultaneously. FIG. 7 (b) shows a pulse sequence.

TABLE 5

| S | A | B | S | D | X | D1 | S2 | Y | X (NOR) | Y (AND) | Z (XOR) |
|---|---|---|---|---|---|----|----|---|---------|---------|---------|
| 1 | 0 | 0 | 1 | 0 | 1 | 0  | 0  | 0 | 1       | 0       | 0       |
| 1 | 0 | 1 | 1 | 0 | 0 | 1  | 0  | 0 | 0       | 0       | 1       |
| 1 | 1 | 0 | 0 | 1 | 0 | 0  | 1  | 0 | 0       | 0       | 1       |
| 1 | 1 | 1 | 0 | 1 | 0 | 0  | 0  | 1 | 0       | 1       | 0       |

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of operating a logical gate using at least one delayed optical router comprising a nonlinear optical medium, wherein the nonlinear optical medium comprises two closely spaced ground states such that a transition between the two ground states is dipole forbidden, and an excited state such that two-photon transitions between the two ground states via the excited state are allowed, the method comprising following steps:
   a) applying, to the nonlinear optical medium, a first laser beam (P) at a first frequency corresponding to a first transition between a first ground state of the two ground states and the excited state;
   b) applying, to the nonlinear optical medium, a second laser beam (C) at a second frequency corresponding to a second transition from a second ground state of the ground states to the excited state;
   c) applying, to the nonlinear optical medium, a third laser beam (A) at a third frequency corresponding to the second transition from the second ground state of the ground states to the excited state;
   d) adjusting an intensity of the second laser beam (C) such that the first laser beam (P) becomes compressed in space and time by electromagnetically induced transparency (EIT) or coherent population oscillations (CPO) due to a modified absorption and dispersion spectra until leaving the nonlinear optical medium thereby to generate a slow light (S);
   e) adjusting at least one of intensities of the first laser beam (P), the second laser beam (C), and the third laser beam (A), to generate a nondegenerate four-wave mixing signal (D), wherein the slow light (S) disappears in response to the generation of the nondegenerate four-wave mixing signal (D); and
   f) using at least one of the generated slow light (S) and the nondegenerate four-wave mixing signal (D) as a result of a logical gate.

2. The method of claim 1, wherein an energy level of the excited state is higher than an energy level of the two ground states.

3. The method of claim 1, wherein an energy level of the excited state is nondegenerate or is split into two energy levels by detuning $\Delta$, where a sum of the energy level of the excited state and an energy level of the $\Delta$ is virtual or real.

4. The method of claim 3, wherein a value of the $\Delta$ is chosen such that the third laser beam (A) enables a transition from the second ground state to the excited state+$\Delta$ or the excited state−$\Delta$.

5. The method of claim 1, wherein the first laser beam (P), the second laser beam (C), the third laser beam (A), and the slow light (S) are synchronized to overlap the first laser beam (P) and the second laser beam (C), and to temporally overlap the slow light (S) and the first laser beam (P).

6. The method of claim 1, wherein the second laser beam (C) the third laser beam (A) are modulated according to the first laser beam (P) and the slow light (S), respectively.

7. The method of claim 1, wherein the first laser beam (P) and the third laser beam (A) correspond to inputs of a Boolean NOT algebra, and the appearance or disappearance of the slow light (S) corresponds to a result of the Boolean NOT algebra.

8. The method of claim 1, wherein two serial delayed optical routers are used for Boolean NOR algebra,
   where a slow light produced by a first delayed optical router of the two serial delayed optical routers is used as a source of a first laser beam (P) of a second delayed optical router, and
   two third laser beams (As), which are respectively inputted to the two serial delayed optical routers, correspond to inputs of the Boolean algebra NOR algebra, and a slow light (S) produced by the second delayed optical router corresponds to a result of the Boolean algebra NOR algebra.

9. The method of claim 1, wherein two serial delayed optical routers are used for Boolean AND algebra,
   where a nondegenerate four-wave mixing signal (D) produced by a first delayed optical router of the two serial delayed optical routers is used as a source of a first laser beam (P) of a second delayed optical router, and
   two third laser beams (As), which are respectively input to the two serial delayed optical routers, correspond to inputs of the Boolean algebra NOR algebra and a signal (D) produced by the second delayed optical router corresponds to a result of the Boolean AND algebra.

10. The method of claim 1, wherein two parallel delayed optical routers are used for Boolean NAND/OR algebra,
    where the first laser beam (P) is shared by the two parallel delayed optical routers,
    two third laser beams (As) correspond to inputs of Boolean NAND and OR algebra,
    each of two slow lights (Ss) produced by the two parallel delayed optical routers corresponds to a result of Boolean NAND algebra, and
    each of two signals (Ds) produced by the two parallel delayed optical routers corresponds to a result of Boolean OR algebra.

11. The method of claim 1, wherein three delayed optical routers are connected for Boolean NOR/XOR/AND algebra,
    where a slow light (S) and a signal (D) produced by a first delayed optical router of the three delayed optical routers are respectively used as second laser beams (Ps) of second and third delayed optical routers,
    a signal (D) produced by the second delayed optical router corresponds to a result of Boolean NOR algebra,
    a signal (D) produced by the third delayed optical router corresponds to a result of Boolean AND algebra, and
    each of two slow lights (S) produced by the second and third optical routers corresponds to a result of Boolean XOR algebra.

* * * * *

UNITED STATES PATENT AND TRADEMARK OFFICE
CERTIFICATE OF CORRECTION

| | | |
|---|---|---|
| PATENT NO. | : 8,259,376 B2 | |
| APPLICATION NO. | : 12/280923 | |
| DATED | : September 4, 2012 | |
| INVENTOR(S) | : B. Ham | |

It is certified that error appears in the above-identified patent and that said Letters Patent is hereby corrected as shown below:

Cover Page 2, References Cited, Other Publications, please add -- Response C to Office Action dated May 3, 2012, U.S. Patent Application No. 13/014,344, filed January 26, 2011, 12 pages. --

Cover Page 2, References Cited, Other Publications, please add -- Notice of Allowance and Fee(s) Due dated May 21, 2012, U.S. Patent Application No. 13/014,344, filed January 26, 2011, 15 pages. --

At Column 10, line 2 (claim 6, line 2), please insert -- and -- after (C).

Signed and Sealed this
Eighteenth Day of December, 2012

David J. Kappos
*Director of the United States Patent and Trademark Office*